United States Patent
Toutain et al.

(10) Patent No.: US 10,572,097 B2
(45) Date of Patent: Feb. 25, 2020

(54) METHOD AND A DEVICE FOR PROCESSING MESSAGES EXCHANGED BETWEEN USERS

(71) Applicant: Orange, Paris (FR)

(72) Inventors: François Toutain, Louannec (FR); Cédric Floury, Perros Guirec (FR)

(73) Assignee: ORANGE, Paris (FR)

( * ) Notice: Subject to any disclaimer, the term of this patent is extended or adjusted under 35 U.S.C. 154(b) by 190 days.

(21) Appl. No.: 15/191,426

(22) Filed: Jun. 23, 2016

(65) Prior Publication Data

US 2016/0378271 A1    Dec. 29, 2016

(30) Foreign Application Priority Data

Jun. 25, 2015 (FR) ...................................... 15 55867

(51) Int. Cl.
| | |
|---|---|
| G06F 3/048 | (2013.01) |
| G06F 3/0481 | (2013.01) |
| G06F 3/0484 | (2013.01) |
| H04L 12/58 | (2006.01) |

(52) U.S. Cl.
CPC .......... *G06F 3/0481* (2013.01); *G06F 3/0484* (2013.01); *H04L 51/04* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 2003/0036393 A1* | 2/2003 | Kanefsky .......... | H04M 1/72552 455/466 |
| 2006/0128404 A1 | 6/2006 | Klassen et al. | |
| 2013/0139107 A1* | 5/2013 | Jung ...................... | G06F 3/017 715/810 |
| 2013/0301482 A1* | 11/2013 | Katis ................. | H04L 29/06176 370/276 |

(Continued)

FOREIGN PATENT DOCUMENTS

| | | |
|---|---|---|
| EP | 2 381 402 A1 | 10/2011 |
| WO | WO 02/087270 A1 | 10/2002 |

OTHER PUBLICATIONS

French Preliminary Search Report dated Apr. 12, 2016 for French Application No. 1555867 filed Jun. 25, 2015.

*Primary Examiner* — Xuyang Xia
(74) *Attorney, Agent, or Firm* — Knobbe, Martens, Olson & Bear, LLP (57) ABSTRACT

One embodiment relates to a processing method for processing messages exchanged between a first user and at least one second user, the method comprising detecting a first message being composed by a first user in a message composition window displayed on a screen of a terminal of the first user. The method may also comprise detecting during this composition the arrival of a second message for the first user and coming from at least one second user; and, in response to this detection, interrupting the composition of the first message, with input by the first user in the composition window following this interruption leading to a third message being created. The method may comprise displaying the first message and the second message on the screen of the terminal, each message being displayed outside the composition window in association with at least one predetermined action that can be confirmed by the first user.

20 Claims, 5 Drawing Sheets

(56) References Cited

U.S. PATENT DOCUMENTS

| | | | |
|---|---|---|---|
| 2014/0143684 A1 | 5/2014 | Oh et al. | |
| 2014/0181687 A1* | 6/2014 | Liu | H04L 51/28 715/752 |
| 2014/0223347 A1* | 8/2014 | Seo | G06F 3/0482 715/769 |
| 2015/0033155 A1* | 1/2015 | Camacho | H04L 51/32 715/758 |
| 2015/0074555 A1* | 3/2015 | Yoon | G06F 3/04817 715/753 |
| 2015/0263997 A1* | 9/2015 | Abate | H04L 51/046 715/753 |

\* cited by examiner

METHOD AND A DEVICE FOR PROCESSING MESSAGES EXCHANGED BETWEEN USERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1555867, filed Jun. 25, 2015, is incorporated herein by reference in its entirety.

BACKGROUND OF THE INVENTION

Field of the Invention

Some embodiments relate to the general field of telecommunications.

More particularly, some embodiments relate to a method of processing messages exchanged between a first user and at least one second user, these messages possibly containing any type of multimedia content, e.g. such as: text; an image; video; etc. Thus, some embodiments apply in preferred but non-limiting manner to short messages of the short message service (SMS) type, multimedia messages of the multimedia messaging service (MMS) type, or indeed electronic messages (emails or messages exchanged using instant messaging).

Description of the Related Art

The democratization of smart phones and tablets means that the number of messages being exchanged nowadays by the users of such equipment is relatively large. It is not always clear to such users how to organize the messages they receive, and in particular how to follow the thread of a conversation, given the multitude of messages received.

Document US 2014/0143684 proposes a method that uses a graphics interface to enable messages received and sent by a user via a terminal to be organized, and more particularly to enable them to be rearranged as a function of contextual information associated with those messages. In that method, the user selects a message on the screen; any new message prepared by the user while that selection is active is linked to the selected message by a contextual link that appears on the screen. That method makes it easy for a user to identify on the screen received and transmitted messages that are linked together.

Figure 1A:
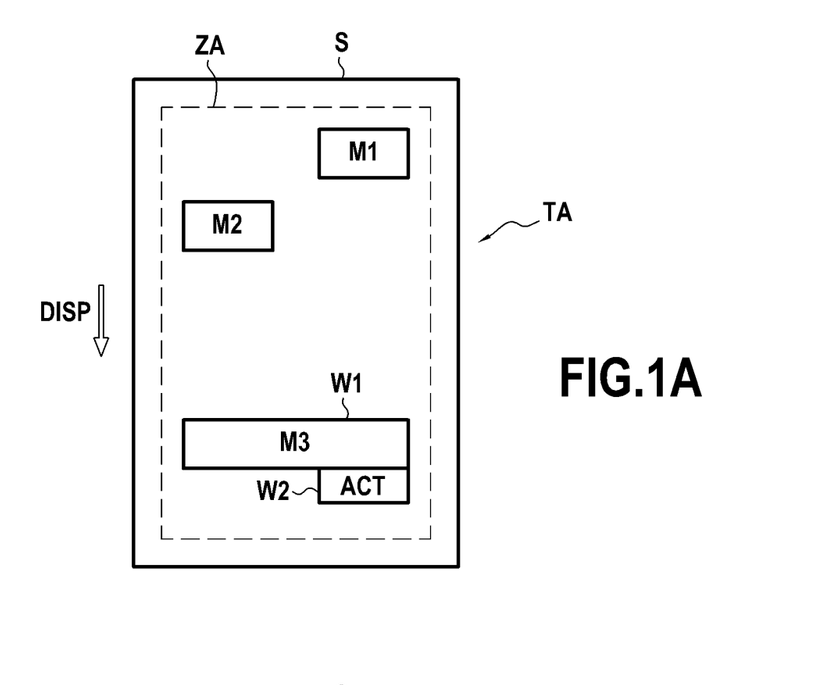
FIGS. 1A and 1B, described above, show a prior art method of displaying messages that have crossed.
Figure 1B:
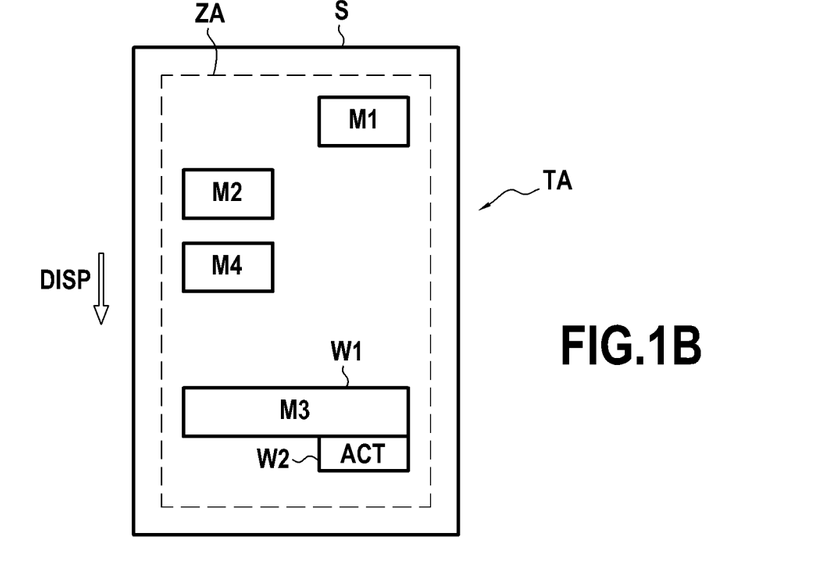

Although the method described in Document US 2014/0143684 makes it easier for the user to navigate among messages, and in particular among older messages stored on the terminal, it does not address the problem of messages that cross. It can happen that while a user A is preparing (composing) a message for a user B, the user B also sends a message to the user A. FIGS. 1A and 1B illustrate such a situation.

In the example shown in FIG. 1A it is assumed that two users A and B are exchanging messages in the context of a run of messages made up of a plurality of messages that are linked together by a mechanism for answering a previously received message. The messages exchanged during this run of messages are displayed in a display zone ZA provided for this purpose on the screen S of the terminal TA of the user A, and they appear in chronological order of the instant at which they were sent from or received by the terminal TA.

Thus, in the example shown in FIG. 1A, it is assumed by way of example that the user A has sent a message M1="Hi, how are you?" to the user B, who has answered with a message M2="Great, what about the match?". The message M1 sent initially by the user A is displayed in first position relative to the display direction DISP for messages exchanged in the context of the run of messages between A and B. The message M2 received by the terminal TA after sending the message M1 is displayed after the message M1 in the direction DISP (i.e., in this example, under the message M1).

As now shown in FIG. 1B, after receiving the message M2, the user A prepares a message M3 in answer to the message M2 in a composition window W1 provided for this purpose in the display zone ZA. The composition window W1 is associated with a window W2 that presents an action ACT (ACT="Send" in this example) that may be confirmed at any moment by the user A, enabling the user A to send the message M3 to the user B.

In FIG. 1B, it is assumed that while the user A is composing the message M3, a message M4 comes from the user B. For example, M4="Did you manage to go?". In compliance with techniques that exist in the prior art, the message M4 is displayed in the display zone ZA after the message M2, while the message M3 that is being prepared is still present in the composition window W1. Under such circumstances, with presently-existing techniques it becomes difficult for the user A to maintain a coherent timeline for the preparation of messages on the terminal.

SUMMARY OF THE INVENTION

Some embodiments seek in particular to improve this situation by proposing a processing method for processing messages exchanged between a first user and at least one second user, the method comprising:

detecting a first message being composed by the first user in a message composition window displayed on a screen of a terminal;

detecting during this composition the arrival of a second message for the first user and coming from said at least one second user;

in response to detecting the arrival of the second message, an interruption process for interrupting the composition of the first message, with input by the first user in the composition window following this interruption leading to a third message being created; and displaying the first message and the second message on the screen of the terminal, each message being displayed outside the composition window in association with at least one predetermined action for confirming by the first user.

Correspondingly, some embodiments relate to a message processing device for processing messages exchanged between a first user and at least one second user, the device comprising:

a first detection module configured to detect a first message being composed by the first user in a message composition window displayed on a screen of a terminal;

a second detection module configured to detect during this composition the arrival of a second message for the first user coming from said at least one second user;

an interruption module that is activated in response to the second detection module detecting the arrival of the second message and that is configured to interrupt composition of the first message, with input by the first user into the composition window after this interruption leading to a third message being created; and a display module configured to display the first message and the second message on the screen of the terminal, each message being displayed by the display module outside the composition window and in association with at least one predetermined action for confirming by the first user.

By way of example, this method (or device) may make use of the graphics interface of the terminal of the first user for managing the display of messages exchanged with other users. No limitation is associated with the nature of the messaging application under consideration for the exchange of these messages, nor on the contents conveyed by these messages. They may be SMS or MMS type messages, messages exchanged in the context of an electronic messaging application or an instant messaging application, etc., and they may convey any type of multimedia content (text, image, video, hyperlinks, etc.).

Thus, in accordance with some embodiments, when a first user receives a message ("second" message as described herein) from a second user while the first user is preparing another message ("first" message as described herein), the message being prepared is automatically split into two portions: firstly a portion that has already been prepared by the user, but that has not been sent to the second user (referred to as the "first" message), and secondly the forthcoming portion that has not yet been prepared by the first user (referred to as the "third" message) that is to follow on from the portion that was prepared before receiving the second message. The already-prepared portion referred to as the "first" message, and the second message received from the second user are then presented to the first user in the display zone of the screen of the terminal (outside the composition window): this enables the first user to be informed that while preparing a message, an associated message has been received simultaneously, thereby drawing the user's attention to the content of both messages. Various actions that can be performed on these two messages are also made available to the first user, so as to enable the first user to control how these messages are displayed on the screen.

Thus, by way of example, said at least one predetermined action associated with the first message comprises canceling the first message and/or sending the first message to said at least one second user.

The first user can thus decide to cancel any sending of the first message that was interrupted by the second message being received while the first message was being prepared, e.g. because the first user considers that the first message is no longer relevant or appropriate given the second message received from the second user. Alternatively, the first user may decide to send the first message to the second user regardless, in spite of the content of the already-received second message.

Preferably, during the display process, the first message with said at least one action that is associated therewith is displayed before the second message and said at least one action that is associated therewith, where "before" is relative to the display direction for displaying a run of messages exchanged between the first user and said at least one second user. Thus in this way, the chronological order in which messages were composed and received is conserved for the first user.

In another example, said at least one predetermined action associated with the second message comprises displaying the second message in the display zone outside the composition window, and displaying the first message in the composition window so as to enable the first user to finish off (i.e. terminate) composing the first message.

The first user can thus move the second message received from the second user back in the timeline of the messages, and then finish off composing the first message (possibly while adjusting the content of the first message) prior to displaying it after the second message.

The actions associated with the first and second messages and displayed on the screen of the terminal of the first user thus enable the first user to conserve a display of incoming and outgoing messages on the terminal with a coherent (chronological) timeline, while also taking account of messages that are being prepared. By this technique, the method gives great flexibility and great freedom to the first user when displaying messages that have crossed.

It should be observed that some embodiments are entirely compatible with various existing messaging technologies (SMS, MMS, instant messaging, electronic messaging, etc.) and requires only a few additional developments or adjustments in the graphics interface made available on the first user's terminal.

In a particular implementation, the method further comprises:

after interruption of the first message, a composition process of the first user composing a third message in the composition window; and a display process for displaying an action associated with the third message, and enabling the first message and the third message to be sent to said at least one second user.

This action, in combination with the preceding actions, enables the user to decide to send the first message and the third message as a group to the second user.

In this implementation, in response to the first user confirming the action associated with the third message, the method comprises:

displaying the first message on the screen outside the composition window and before the second message relative to the display direction for displaying a run of messages exchanged between the first user and said at least one second user; and displaying the third message on the screen outside the composition window and after the second message relative to the display direction for displaying the run of messages.

The messages are thus displayed in chronological order while taking account of the instants at which messages are prepared on and received by the terminal.

In a particular implementation, the various processes of the processing method are determined by computer program instructions.

Consequently, some embodiments also provide a computer program on a data medium, the program being suitable for being performed in a processing device or more generally in a computer, the program including instructions adapted to performing processes of a processing method as described above.

The program may use any programming language, and be in the form of source code, object code, or code intermediate between source code and object code, such as in a partially compiled form, or in any other desirable form.

Some embodiments also provide a computer-readable data medium, including instructions of a computer program as mentioned above.

The data medium may be any entity or device capable of storing the program. By way of example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program may in particular be downloaded from an Internet type network.

Alternatively, the data medium may be an integrated circuit in which the program is incorporated, the circuit being adapted to execute or to be used in the execution of the method in question.

Some embodiments also provide a terminal including a graphics interface as described herein.

In other embodiments and implementations, it is also possible to envisage that the processing method, the processing device, the graphics interface, and the terminal present in combination some or all of the above-specified characteristics.

BRIEF DESCRIPTION OF THE DRAWINGS

Other characteristics and advantages of some embodiments appear from the following description made with reference to the accompanying drawings, which show an implementation having no limiting character. In the figures.

DETAILED DESCRIPTION OF THE PREFERRED EMBODIMENT

Figure 2:
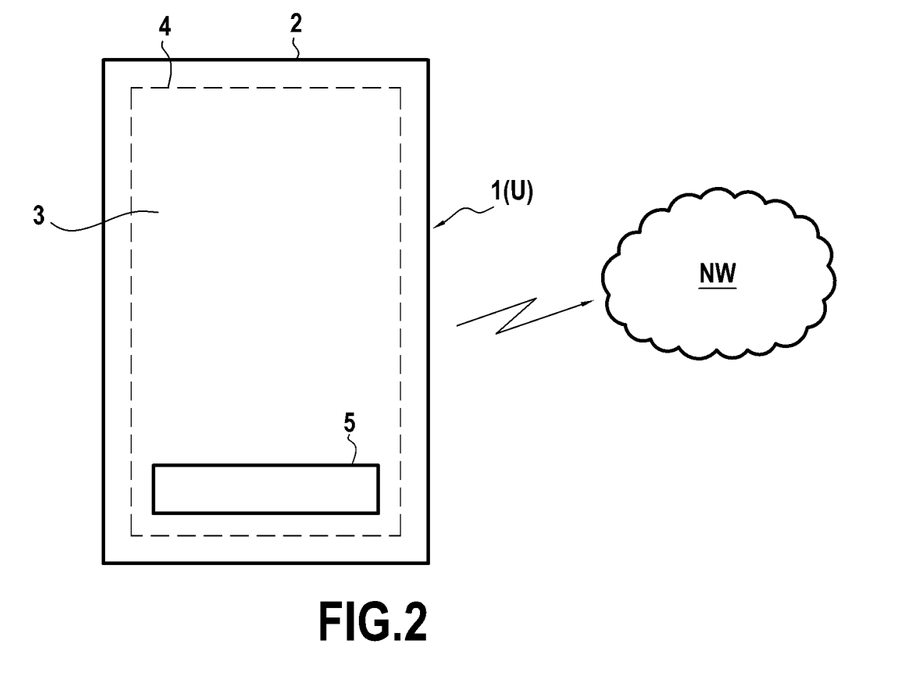
FIG. 2 shows a terminal having a graphics interface and including a processing device for processing messages in accordance with a particular implementation.

FIG. 2 shows a terminal 1 of a user U1 in its environment, the terminal having a screen 2 and being in accordance with a particular embodiment.

No limitation is associated with the nature of the terminal 1. By way of example, it may be a smart phone, a tablet, a laptop computer, etc., for which the user U1 has subscribed to a messaging service enabling the terminal to be used for exchanging messages with other users likewise having terminals, the messages passing via a telecommunications network NW.

The messaging service to which the user U1 has subscribed may for example be a service for SMS or MMS type messages, for electronic messages (emails), for instant messages, etc., and it may convey any type of multimedia content (e.g. text, images, photos, videos, hyperlinks, etc.).

Furthermore, no limitation is associated with the nature of the telecommunications network NW (fixed or mobile, wired or wireless, public or private, etc.).

Thus, by way of example in the description below, consideration is given to an SMS type messaging service made available by a mobile telecommunications network, and to the terminal 1 being a smart phone connected to that network.

Figure 3:
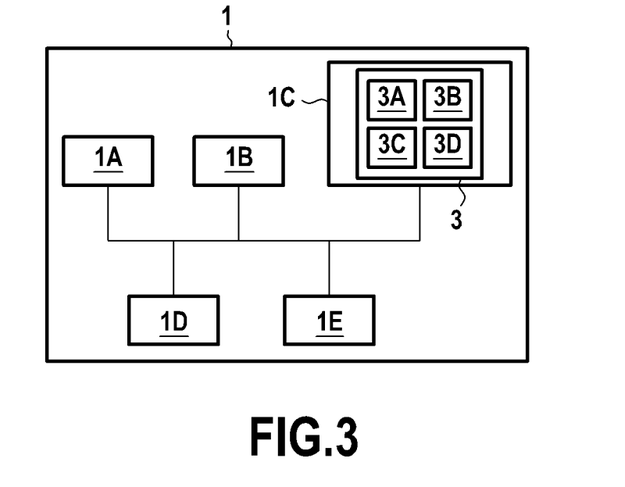
FIG. 3 shows the hardware architecture of the FIG. 2 terminal, in a particular embodiment.

In the presently-described embodiment, the terminal 1 has the hardware architecture of a computer, as shown diagrammatically in FIG. 3. In particular, it comprises a processor 1A, a random access memory (RAM) type memory 1B, a ROM type memory 1C, a rewritable non-volatile memory 1D, and a module for communicating over the network NW, all themselves known.

The display of SMS messages exchanged by the user U1 with other users U2, . . . , UN, on the screen 2 of the terminal 1 of the user U1 is managed by a graphics interface 3 (i.e. a man-machine dialog device also known as a man-machine interface (MMI)). This graphics interface 3 is defined by one or more software modules included in the operating system of the terminal 1 and, in this example, stored in the ROM 1C of the terminal 1. In addition to the conventional means implemented by a graphics interface for displaying SMS messages on a terminal, this graphics interface 3 also includes a processing device (software) for processing messages, and suitable for performing the main processes of a processing method as described herein.

The ROM 1C thus constitutes a data medium that is readable by the processor 1A and that stores a computer program including instructions for executing processes of a processing method as described herein. In equivalent manner, this computer program defines the detection, interruption, and display functional and software modules 3A-3B, 3C, and 3D for the processing device and for the graphics interface 3, as described in greater detail below with reference in particular to FIG. 4 et seq.

In the example below, attention is given to a run (series) of SMS messages exchanged between the user U1 and at least one other user U2. For simplification purposes, it is assumed in the description below that only one user U2 is participating in this exchange of SMS messages with the user U1.

In the example shown by way of indication in FIG. 2, the example also assumes that at least one message has already been exchanged between the users U1 and U2, and that the user U1 is preparing a message for the user U2 in answer to a message previously received from the user U2. More precisely, in this example, consideration is given to a run of messages between the user U2 and the user U1 that already comprises a message M1 sent by the user U1 to the user U2 (e.g. M1="Hi, how are you?", as in the example shown in FIG. 1A), followed by a message M2 from the user U2 in answer to the message M1 (e.g. M2="Great, what about the match?"). The messages M1 and M2 that have already been sent and received respectively by the terminal 1 are displayed in conventional manner by the graphics interface 3 via its display module 3D in the display zone 4, e.g. being offset from each other and in two distinct colors in order to identify easily the user from whom the message comes. Such techniques are known to the person skilled in the art and they are not described in detail herein.

The above-mentioned assumption for how the conversation continues is nevertheless not itself limiting. Some embodiments described herein make it possible specifically to manage messages that have crossed, including in a situation in which the user U1 is preparing a first message for the user U2. In other words, no limitation is associated with the number of messages included in the run of messages exchanged between the two users, in particular when the methods described herein are being applied, i.e. when a crossed-message situation is present.

To enable the user U1 to answer the message M2 received from the user U2, the graphics interface 3 provides a message composition window 5 in the display zone 4, and the user U1 can input the message M3 answering the message M2 in that window, e.g. in the form of text input via a virtual or hardware keyboard of the terminal 1, or in the form of multimedia content, e.g. selected from predefined contents (e.g. a photo or a video). In the presently-described implementation, this composition window 5 is displayed in the display zone 4 together with the messages M1 and M2 that have already been exchanged with the user U2.

In a variant, when no message has yet been exchanged between the two users, the composition window 5 may be displayed in a limited zone of the display zone 4 or it may occupy the entire display zone 4.

As mentioned above, some embodiments enable the user U1 to manage crossed messages exchanged between the user U1 and one or more users U2, while keeping a coherent timeline in the display of these messages for the user U1 on the screen of the terminal 1. This management of crossed messages is made possible by the graphics interface 3 performing a processing method as described herein, with the main processes of this method being shown in the form of a flow chart in FIG. 4, as described below.

Figure 4:
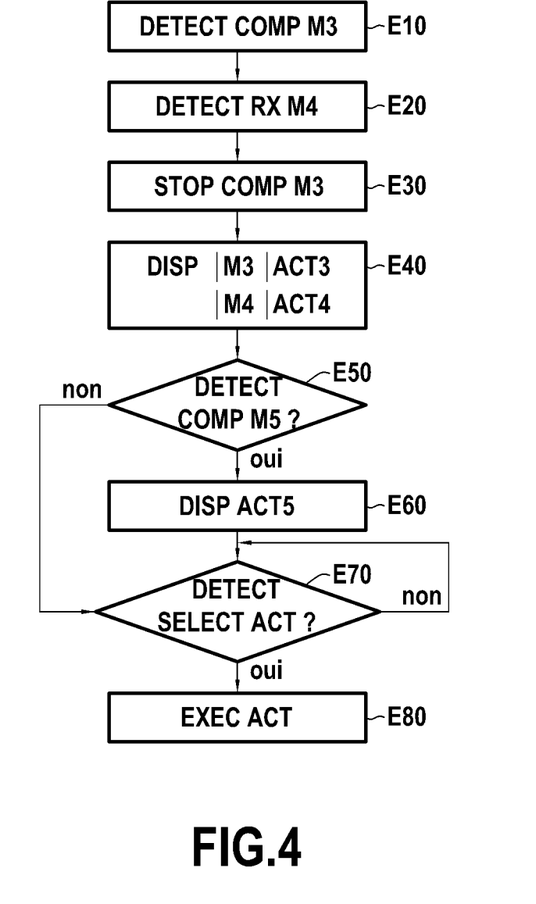
FIG. 4, in the form of a flow chart, shows the main process of an exemplary processing method, as performed by the processing device of FIG. 2.

It is thus assumed that the user U1 is composing (e.g. preparing) a message M3 in answer to the message M2 received from the user U2 ("first" message as described herein) by acting in the composition window 5 provided by the graphics interface 3 on the terminal 1. The detection module 3A of the graphics interface 3 detects (process E10) that this message M3 is being composed, e.g. once a character has been input by the user U1 into the composition window 5, or once a multimedia content has been inserted in this window.

It is also assumed that while the user U1 is composing the message M3, the detection module 3B of the graphics interface 3 detects (process E20) the arrival at the terminal 1 of a message M4 (e.g. M4="Did you manage to go?") for the user U1 ("second" message as described herein) coming from the user U2 and sent by the user U2. By way of example, this detection may be implemented by an event transmitted by a message handler (management automaton) of the user U1 that is installed in the terminal 1 and is itself known.

In response to this detection, the interruption module 3C of the graphics interface 3 automatically interrupts (process E30) inputting of the message M3, such that the message M3 contains only those content elements that were input by the user U1 in the composition window 5 between the detection of process E10 and the detection of process E20. The user U1 can then still input the remainder of the content of the message M3 in the composition window 5, but all further input by the user U1 of multimedia content in the composition window 5 after this interruption causes a new message M5 to be created by the graphics interface 3 ("third" message as described herein). In other words, the interruption performed by the interruption module 3C comprises automatically splitting the answer from the user U1 into two portions: a first portion forming the message M3 and constituted by elements that were input by the user U1 prior to the arrival of the message M4 being detected, and a second portion forming a new message and constituted by elements as input by the user U1 after the interruption.

In accordance with some embodiments, the interruption performed by the interruption module 3C causes the module 3D to display (process E40) the message M3 comprising the partial content (referred to as "partial" because of its sudden interruption) as input by the user U1, and to display the message M4 received from the user U2. These messages are displayed by the display module 3D of the graphics interface 3 in the display zone 4 outside the composition window 5. In addition, in some embodiments, during this display:

the message M3 is displayed in association with at least one action ACT3 made available to the user U1 for acting on the message M3; and the message M4 is associated with at least one action ACT4 made available to the user U1 for acting on the message M4.

By way of example, the actions ACT3 and ACT4 are represented on the graphics interface 3 as buttons labeled with these actions and suitable for being selected by the user U1 or on which the user can click. Naturally, other graphical representations of these actions could be envisaged.

Figure 5A:
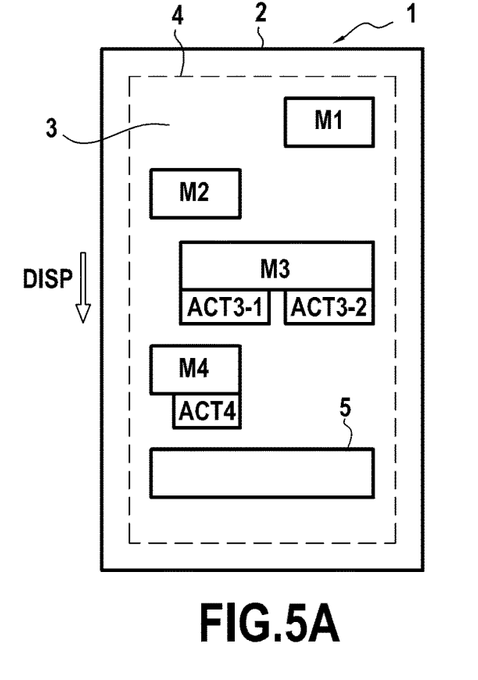
FIGS. 5A and 5B show the display of various actions made available to the user of the FIG. 2 terminal for managing crossed message in an exemplary embodiment.

In the presently-described implementation, and as shown in FIG. 5A, said at least one action ACT3 associated with the message M3 comprises a plurality of actions, and more precisely the following two actions:

an action ACT3-1="Cancel", which, when confirmed by the user U1, leads to the message M3 being cancelled; and an action ACT3-2="Send", which, when confirmed by the user U1, leads to the still-incomplete message M3 being sent to the user U2.

Naturally, other types of action may be envisaged and configured by the display module 3D, and possibly there may be more than two of them.

In the presently-described implementation, the message M3 and the actions ACT3-1 and ACT3-2 that are associated therewith are displayed in the display direction after the messages that were previously exchanged between the users U1 and U2 (represented by the down arrow in FIG. 5A), and before the message M4. As a general rule, such a display direction complies with the message timeline. In this convention, the message M3 appears for the user U1 at a time prior to the message M4.

As mentioned above, the message M4 is displayed by the display module in the display zone 4 in association with at least one action ACT4, and more particularly in this example with a single action "move back". This action ACT4, when confirmed by the user U1, leads to the display of the message M4 being displayed before of the message M3 relative to the display direction for the run of messages exchanged between the users U1 and U2, and represented in FIG. 5A by the arrow. In other words, the user U1 confirming this action enables the message M4 to be caused to appear for the user U1 as being earlier than the message M3.

Following this display, the user U1 can continue to use the composition window 5 to input a new message M5 for the user U2 (answer "yes" in process E50). This input can take place in knowledge of the message M2 received from the user U2. For example, the message M5 may be a message having the following content: "Yes, went with Manu, it was incredible!".

Figure 5B:
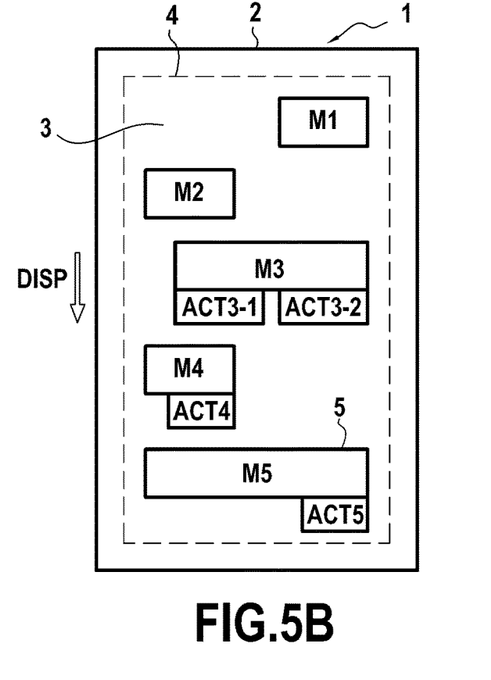

On detecting this new input, the display module 3D now associates an action ACT5 (e.g. ACT5="Send all") with the composition window and causes this action to be displayed on the screen of the terminal 1 (process E60), e.g. in the display window 4 under the composition window 5, as shown in FIG. 5B. When this action ACT5 is confirmed by the user U1, it enables the partial message M3 and the message M5 as newly input by the user U1 to be sent to the user U2.

The user U1 can then confirm (process E70) any of the actions ACT3, ACT4, and ACT5 displayed on the screen 2 of the terminal 1. In response to the user U1 confirming any one of these actions, the display module 3D executes (process E80) the selected action.

FIGS. 6A to 6E show the result on the screen 2 of confirming the various actions proposed to the user U1 by the processing method described herein, these actions being executed by the display module 3D of the graphics interface 3 in response to being confirmed by the user U1. In the commentary accompanying these figures, the terms "before" and "after" should be understood as being relative to the display direction on the screen of messages in the run of messages exchanged between the user U1 and U2, and represented in these figures by an arrow.

Figure 6A:
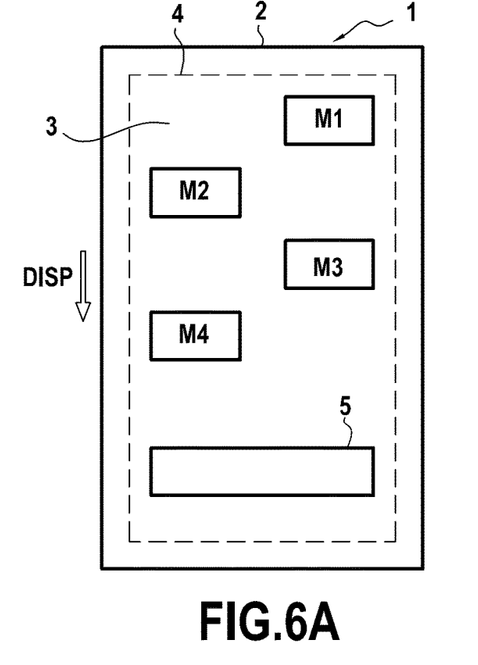
FIGS. 6A-6E show the result of executing various actions made available to the user of the terminal of FIG. 2 for managing crossed messages in an exemplary embodiment.

Thus, FIG. 6A shows the display provided by the display module 3D after the user U1 has selected (confirmed) the action ACT3-2="Send". It should be recalled that this action serves to send the partial message M3 to the user U2, which message is then displayed in the display zone 4 of the screen 2 of the terminal 1 between the messages M2 and M4 received from the user U2.

Figure 6B:
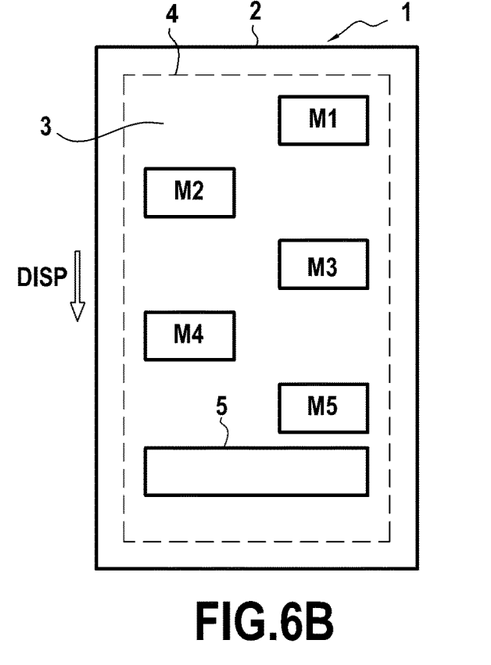

FIG. 6B shows the display provided by the display module 3D after the user U1 has selected (confirmed) the action ACT5="Send all". It should be recalled that this action enables the partial message M3 and the message M5 composed by the user U1 after receiving the message M4 to be sent to the user U2. The message M3 is then displayed by the display module 3D in the display zone 4 of the screen 2 of the terminal 1 between the messages M2 and M4 received from the user U2, while the message M5 is displayed after the message M4.

Figure 6C:
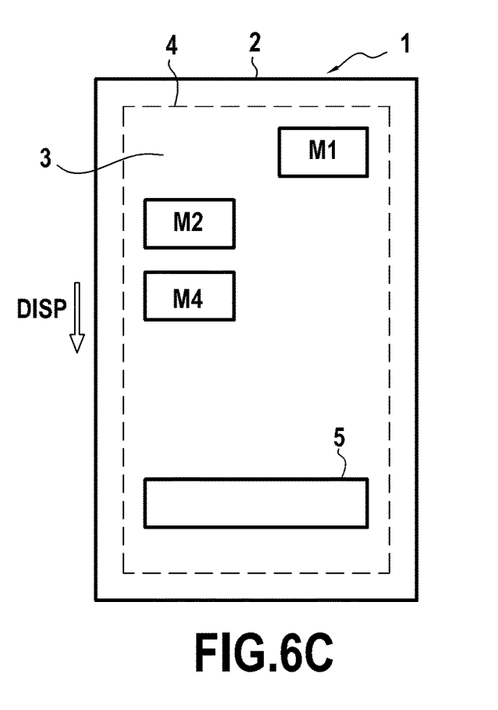
Figure 6D:
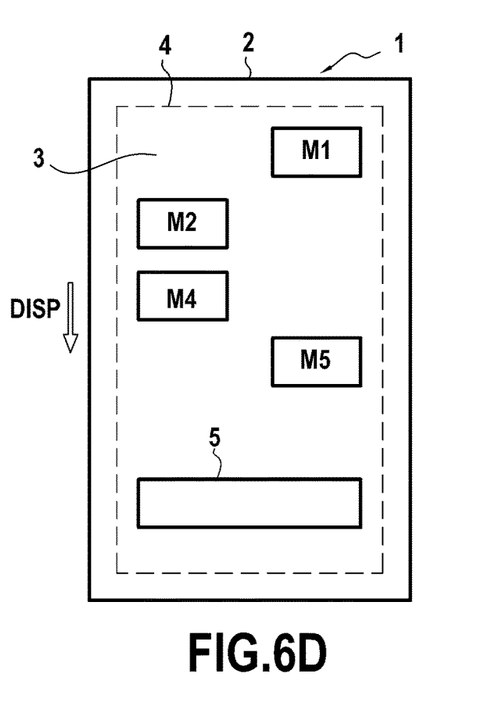

FIG. 6C shows the display provided by the display module 3D after the user U1 has selected (confirmed) the action ACT3-1="Cancel". It should be recalled that this action enables the sending of the partial message M3 to the user U2 to be inhibited. The messages M1, M2, and M4 are then displayed in the display zone 4 of the screen 2 of the terminal 1 in the chronological order of being sent by the terminal 1 (message M1) and of being received by the terminal 1 (messages M2 and M4). A message M5 composed by the user U1 after receiving the message M4 is then displayed after the message M4, as shown in FIG. 6D. The message M3 is no longer displayed in the run of messages, since it has already been cancelled by the user U1.

Figure 6E:
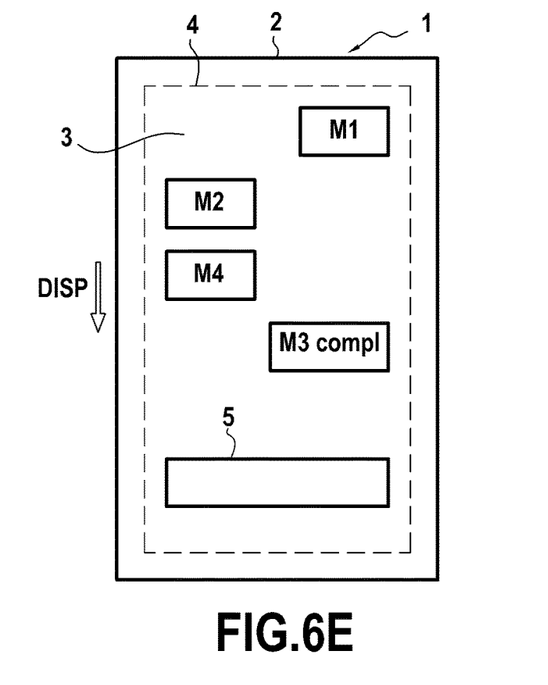

FIG. 6E shows the display provided by the display module 3D after the user U1 has selected (confirmed) the action ACT4="Move back". It should be recalled that this action enables the message M4 as received from the user U2 to be displayed in the display zone 4 outside the composition window 5 and enables the partial message M3 to be displayed once more in the composition window 5 so as to enable the user U1 to finish this message off (possibly after changing its content). In other words, this action has the effect of inhibiting the creation of a new message that is distinct from the message M3 in the event of the user U1 desiring to finish off the message M3 that had already been started when the message M4 was received from the user U2. The answer from the user U1 to the message M2 is thus contained in a single message M3.

Naturally, the predetermined actions ACT3 to ACT5 may be added to and/or replaced by other actions made available to the user U1 for acting on the messages M3 to M5.

It should be observed that the displays resulting from executing actions confirmed by the user U1 are preferably performed in the display zone 4 and possibly in the composition window 5 so as to replace the displays shown in FIGS. 5A and 5B, in other words the displays of the first, second, and where applicable third messages in association with the actions associated therewith.

The person skilled in the art realizes that the present disclosure by no means is limited to the embodiments described above. On the contrary, many modifications and variations are possible within the scope of the appended claims.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage. Also two or more steps or processes may be performed concurrently or with partial concurrence. Further, the steps or processes of the methods may be performed in an order different from what has been disclosed. All such variations are within the scope of the disclosure. Additionally, even though the disclosure has been described with reference to specific exemplifying embodiments thereof, many different alterations, modifications and the like will become apparent for those skilled in the art. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method of processing messages exchanged between a first user and a second user, the method comprising:
   detecting a first message being composed by the first user in a composition window displayed on a screen of a terminal of the first user;
   detecting, during composition of the first message, the arrival of a second message for the first user and coming from said second user, the second message associated with a same messaging thread as the first message;
   in response to detecting the arrival of the second message, interrupting the composition of the first message; and
   in response to any further input by the first user in the composition window after interruption of the composition of the first message:
      automatically creating a third message including at least the further input by the first user in the composition window; and
      displaying the first message and the second message on the screen of the terminal, each of the first and second messages being displayed on the screen of the terminal outside the composition window and in association with a respective at least one predetermined action that can be confirmed by the first user.

2. The method according to claim 1, wherein the displaying comprises displaying the first message and its respective at least one predetermined action before the second message and its respective at least one predetermined action relative to a display direction for displaying a run of messages exchanged between the first user and said second user.

3. The method according to claim 1, wherein the respective at least one predetermined action associated with the first message comprises:
   canceling the first message; and
   sending the first message to said second user.

4. The method according to claim 1, wherein confirming the respective at least one predetermined action associated with the second message causes displaying the second message in the display zone outside the composition window, and displaying the first message in the composition window so as to enable the first user to finish off composing the first message.

5. The method according to claim 1, comprising:
   after interruption of the first message, the first user composing the third message in the composition window; and
   displaying an action associated with the third message, the action associated with the third message when confirmed by the first user causes the first message and the third message to be sent to said second user.

6. The method according to claim 5, wherein, in response to the action associated with the third message being confirmed by the first user, the method comprising:
   displaying the first message on the screen outside the composition window and before the second message relative to the display direction for displaying a run of messages exchanged between the first user and said second user; and
   displaying the third message on the screen outside the composition window and after the second message relative to the display direction for displaying the run of messages.

7. The method according to claim 1, wherein displaying the first message on the screen of the terminal outside the composition window comprises displaying an unsent draft of the first message, the composition of which draft was interrupted in response to detection of the arrival of the second message.

8. A computer having stored thereon a program comprising instructions, when said instructions are executed by a processor, the processor performs a method for processing messages exchanged between a first user and a second user, the method comprising:
   detecting a first message being composed by the first user in a composition window displayed on a screen of a terminal of the first user;
   detecting, during composition of the first message, the arrival of a second message for the first user and coming from said second user, the second message associated with a same messaging thread as the first message;
   in response to detecting the arrival of the second message, interrupting the composition of the first message; and
   in response to any further input by the first user in the composition window after interruption of the composition of the first message:
      automatically creating a third message including at least the further input by the first user in the composition window; and
      displaying the first message and the second message on the screen of the terminal, each of the first and second messages being displayed on the screen of the terminal outside the composition window and in association with a respective at least one predetermined action that can be confirmed by the first user.

9. A non-transitory computer readable data medium having stored thereon a computer program comprising instructions that, when executed by a processor, cause the processor to perform a method for processing messages exchanged between a first user and a second user, the method comprising:
   detecting a first message being composed by the first user in a composition window displayed on a screen of a terminal of the first user;
   detecting, during composition of the first message, the arrival of a second message for the first user and coming from said second user, the second message associated with a same messaging thread as the first message;
   in response to detecting the arrival of the second message, interrupting the composition of the first message; and
   in response to any further input by the first user in the composition window after interruption of the composition of the first message:
      automatically creating a third message including at least the further input by the first user in the composition window; and
      displaying the first message and the second message on the screen of the terminal, each of the first and second messages being displayed on the screen of the terminal outside the composition window and in association with a respective at least one predetermined action that can be confirmed by the first user.

10. The non-transitory computer readable medium of claim 9, wherein the displaying comprises displaying the first message and its respective at least one predetermined action before the second message and its respective at least one predetermined action relative to a display direction for displaying a run of messages exchanged between the first user and the second user.

11. The non-transitory computer readable medium of claim 9, wherein the respective at least one predetermined action associated with the first message comprises:
   canceling the first message; and
   sending the first message to the second user.

12. The non-transitory computer readable medium of claim 9, wherein confirming the respective at least one predetermined action associated with the second message causes displaying the second message in the display zone outside the composition window and displaying the first message in the composition window so as to enable the first user to finish off composing the first message.

13. The non-transitory computer readable medium of claim 9, wherein the method comprises
   after interruption of the first message, the first user composing the third message in the composition window; and
   displaying an action associated with the third message, the action associated with the third message when confirmed by the first user causes the first message and the third message to be sent to the second user.

14. The non-transitory computer readable medium of claim 13, wherein, in response to the action associated with the third message being confirmed by the first user, the method comprises:
   displaying the first message on the screen outside the composition window and before the second message relative to the display direction for displaying a run of messages exchanged between the first user and the second user; and
   displaying the third message on the screen outside the composition window and after the second message relative to the display direction for displaying the run of messages.

15. A message processing device for processing messages exchanged between a first user and a second user, the device comprising a processor and a memory, wherein the device is configured to:
   detect a first message being composed by the first user in a composition window displayed on a screen of a terminal of the first user;
   detect, during composition of the first message, the arrival of a second message for the first user and coming from said second user, the second message associated with a same messaging thread as the first message;

in response to the detection of the arrival of the second message, interrupt composition of the first message; and in response to any further input by the first user into the composition window after interruption of the composition of the first message:

automatically create a third message including at least the further input by the first user in the composition window; and display the first message and the second message on the screen of the terminal, each of the first and second messages being displayed on the screen of the terminal outside the composition window and in association with a respective at least one predetermined action that can be confirmed by the first user.

16. The message processing device of claim 15, wherein the message processing device is implemented in a graphics interface.

17. The message processing device of claim 15, wherein the message processing device is implemented in the terminal of the first user.

18. The message processing device of claim 15, wherein the processor is configured to display the first message and its respective at least one predetermined action before the second message and its respective at least one predetermined action relative to a display direction for displaying a run of messages exchanged between the first user and the second user.

19. The message processing device of claim 15, wherein the respective at least one predetermined action associated with the first message comprises:

canceling the first message; and sending the first message to the second user.

20. The message processing device of claim 15, wherein confirming the respective at least one predetermined action associated with the second message causes displaying the second message in the display zone outside the composition window and displaying the first message in the composition window so as to enable the first user to finish off composing the first message.

* * * * *